US012593096B2

(12) United States Patent (10) Patent No.: US 12,593,096 B2
Wang et al. (45) Date of Patent: Mar. 31, 2026

(54) DISPLAY METHOD FOR VIDEO PLAYING PROGRESS BAR, APPARATUS, DEVICE, AND STORAGE MEDIUM

(71) Applicant: Beijing Zitiao Network Technology Co., Ltd., Beijing (CN)

(72) Inventors: Sen Wang, Beijing (CN); Junpeng Xiao, Beijing (CN); Weilin Guan, Beijing (CN); Shuai Han, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 167 days.

(21) Appl. No.: 18/569,817

(22) PCT Filed: Aug. 5, 2022

(86) PCT No.: PCT/CN2022/110432
§ 371 (c)(1),
(2) Date: Dec. 13, 2023

(87) PCT Pub. No.: WO2023/020296
PCT Pub. Date: Feb. 23, 2023

(65) Prior Publication Data
US 2024/0298062 A1 Sep. 5, 2024

(30) Foreign Application Priority Data
Aug. 18, 2021 (CN) .......................... 202110948822.2

(51) Int. Cl.
*H04N 21/431* (2011.01)
*H04N 21/845* (2011.01)
(52) U.S. Cl.
CPC ..... *H04N 21/4312* (2013.01); *H04N 21/8456* (2013.01)

(58) Field of Classification Search
CPC ... G06F 9/00; G06F 1/24; G06F 15/16; G06F 9/44; G06F 1/16; G06F 3/01;
(Continued)

(56) References Cited

U.S. PATENT DOCUMENTS 10,575,043 B2 * 2/2020 Da Fonseca ..... H04N 21/47202
2006/0013555 A1 1/2006 Poslinski
(Continued)

FOREIGN PATENT DOCUMENTS

CN 101888502 A 11/2010
CN 103118293 A 5/2013
(Continued)

OTHER PUBLICATIONS

Extended European Search Report for European Application No. 22857608.8, mailed on Oct. 11, 2024, 10 pages.
(Continued)

*Primary Examiner* — Rayeez R Chowdhury
(74) *Attorney, Agent, or Firm* — Astute IP Law Group

(57) ABSTRACT

A display method for a video playing progress bar, an apparatus, a device, and a storage medium are provided. The method includes: acquiring a played duration of a target video when monitoring that a current time reaches a preset time period; determining a proportional relationship between the played duration of the target video and a total video duration; determining position information of a progress standard bar on the video playing progress bar according to the proportional relationship; determining an end position of a first color bar and a start position of a second color bar based on the position information; drawing the first color bar based on the end position of the first color bar, and drawing the second color bar based on the start position of
(Continued)

the second color bar; and displaying the video playing progress bar of the target video based on the first and second color bar.

18 Claims, 4 Drawing Sheets

(58) Field of Classification Search
CPC .... G06F 3/0482; G06F 3/0485; G06F 9/4401; G06F 3/00; G06F 3/0484; G06F 3/0481; G06F 3/04845; G06F 40/106; G06F 3/033; G06F 3/048; G06F 3/04883
See application file for complete search history.

(56)                References Cited

U.S. PATENT DOCUMENTS

| | | | |
|---|---|---|---|
| 2006/0020966 A1* | 1/2006 | Poslinski | G09B 5/00 386/E5.07 |
| 2007/0169157 A1* | 7/2007 | Abernethy | H04N 21/4325 386/E5.001 |
| 2008/0031595 A1* | 2/2008 | Cho | G11B 27/36 386/E5.001 |
| 2011/0029892 A1* | 2/2011 | Kurtz | G06Q 10/107 715/752 |
| 2013/0142495 A1* | 6/2013 | Terai | G11B 27/105 386/230 |
| 2015/0153931 A1* | 6/2015 | Zhang | G06F 3/04812 715/768 |
| 2015/0319506 A1* | 11/2015 | Kansara | H04N 21/43079 725/32 |
| 2016/0110328 A1* | 4/2016 | Yang | G06F 40/103 715/811 |
| 2019/0349650 A1* | 11/2019 | Zhou | H04N 21/8456 |
| 2020/0245040 A1* | 7/2020 | Majdabadi | H04N 21/8456 |

FOREIGN PATENT DOCUMENTS

| | | |
|---|---|---|
| CN | 103702220 A | 4/2014 |
| CN | 104239053 A | 12/2014 |
| CN | 106935254 A | 7/2017 |
| CN | 106990951 A | 7/2017 |
| CN | 107436766 A | 12/2017 |
| CN | 109151554 A | 1/2019 |
| CN | 109286847 A | 1/2019 |
| CN | 111338719 A | 6/2020 |
| JP | 2014-236288 A | 12/2014 |

OTHER PUBLICATIONS

Communication Pursuant to Rules 70(2) and 70a(2) EPC for European Application No. 22857608.8, mailed on Oct. 29, 2024, 1 page.
Office Action for Chinese Patent Application No. 202110948822.2, mailed on Mar. 28, 2025, 16 pages.
Office Action for Japanese Patent Application No. 2023-578192, mailed on Feb. 25, 2025, 8 pages.
Communication pursuant to Article 94(3) EPC for European Patent Application No. 22857608.8, mailed on Jun. 3, 2025, 6 pages.

* cited by examiner

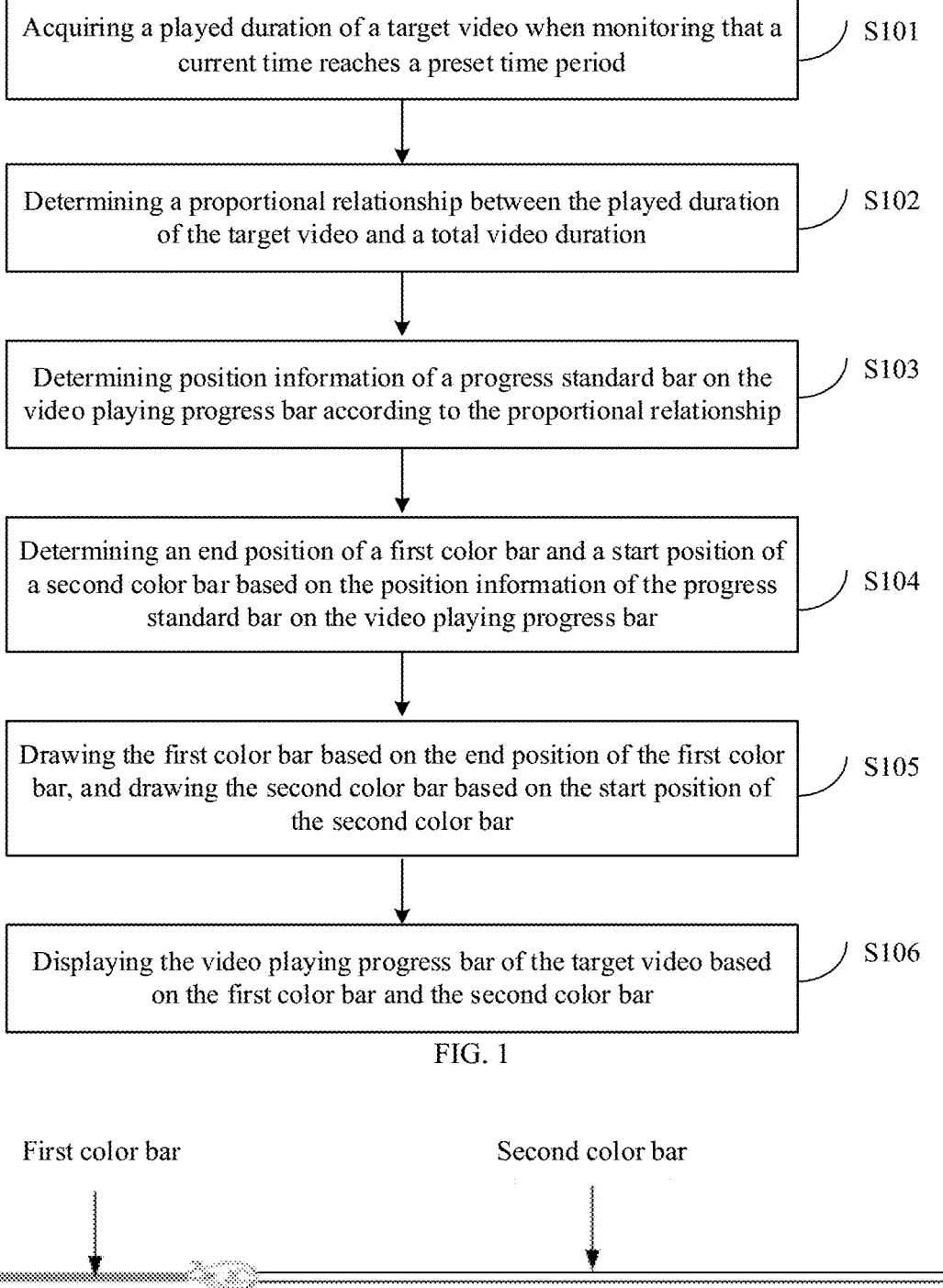

Acquiring a played duration of a target video when monitoring that a current time reaches a preset time period — S101

Determining a proportional relationship between the played duration of the target video and a total video duration — S102

Determining position information of a progress standard bar on the video playing progress bar according to the proportional relationship — S103

Determining an end position of a first color bar and a start position of a second color bar based on the position information of the progress standard bar on the video playing progress bar — S104

Drawing the first color bar based on the end position of the first color bar, and drawing the second color bar based on the start position of the second color bar — S105

Displaying the video playing progress bar of the target video based on the first color bar and the second color bar — S106

FIG. 1

First color bar          Second color bar

FIG. 2

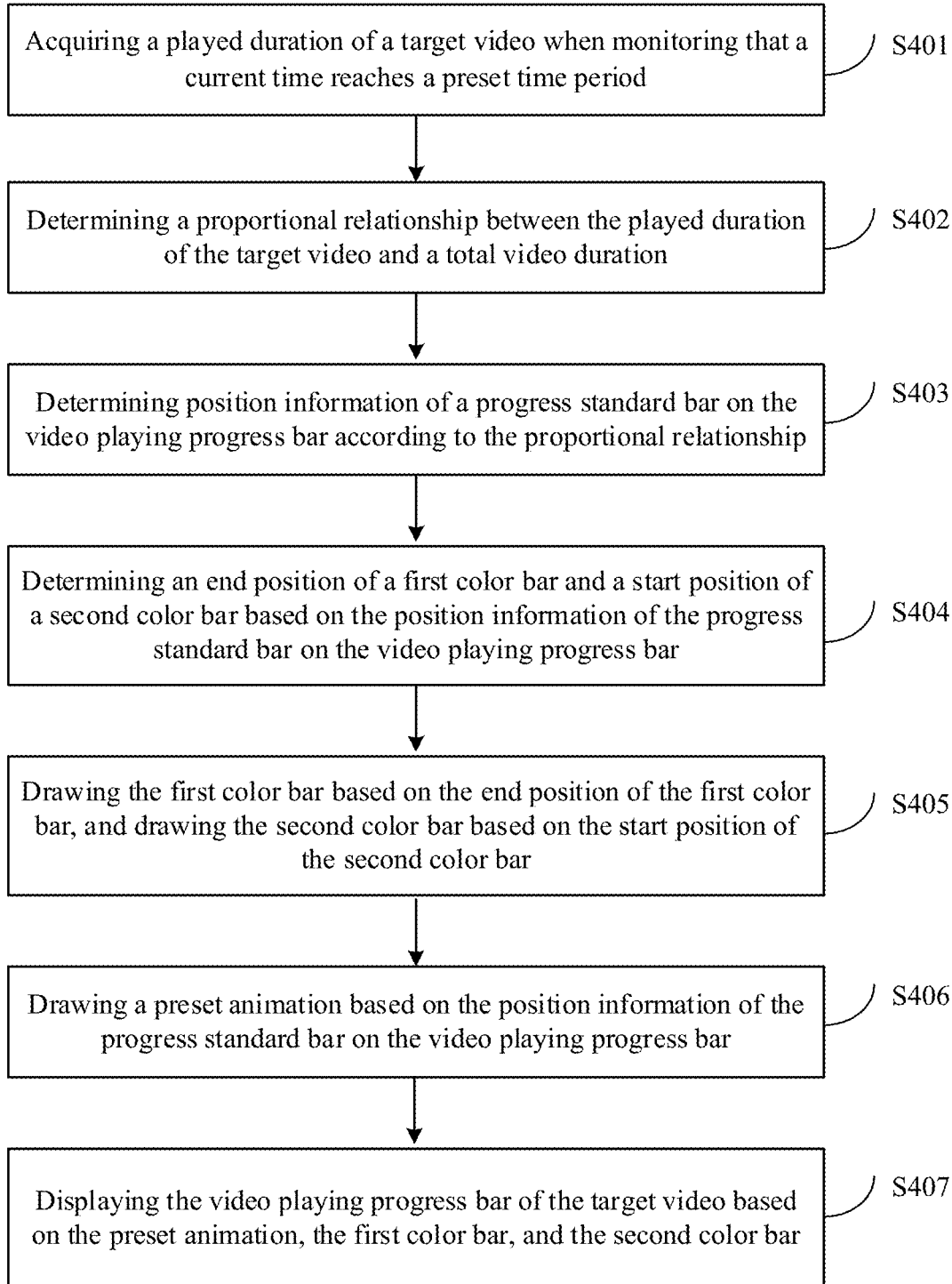

Acquiring a played duration of a target video when monitoring that a current time reaches a preset time period  — S401

Determining a proportional relationship between the played duration of the target video and a total video duration  — S402

Determining position information of a progress standard bar on the video playing progress bar according to the proportional relationship  — S403

Determining an end position of a first color bar and a start position of a second color bar based on the position information of the progress standard bar on the video playing progress bar  — S404

Drawing the first color bar based on the end position of the first color bar, and drawing the second color bar based on the start position of the second color bar  — S405

Drawing a preset animation based on the position information of the progress standard bar on the video playing progress bar  — S406

Displaying the video playing progress bar of the target video based on the preset animation, the first color bar, and the second color bar  — S407

FIG. 4

First acquiring module — 501

First determining module — 502

Second determining module — 503

Third determining module — 504

First drawing module — 505

Display module — 506

Memory — 602

Input apparatus — 603

Processor — 601

Output apparatus — 604

DISPLAY METHOD FOR VIDEO PLAYING PROGRESS BAR, APPARATUS, DEVICE, AND STORAGE MEDIUM

CROSS-REFERENCE TO RELATED APPLICATION

This is a national stage application filed under 35 U.S.C. 371 based on International Patent Application No. PCT/CN2022/110432, filed Aug. 5, 2022, which claims priority to Chinese Patent Application No. 202110948822.2 filed on Aug. 18, 2021, and entitled "DISPLAY METHOD FOR VIDEO PLAYING PROGRESS BAR, APPARATUS, DEVICE, AND STORAGE MEDIUM", the disclosures of which are incorporated herein by reference in their entireties.

TECHNICAL FIELD

The present disclosure relates to the field of data processing, in particular to a display method for a video playing progress bar, an apparatus, a device, and a storage medium.

BACKGROUND

In the field of Internet video, in order to display the playing progress of the video, a video playing progress bar may be used for display.

At present, it is common to use a long rectangular control of a system as a carrier to display the playing progress of the video, namely the increase in the playing progress is displayed by drawing an increase of a rectangular image in a certain fixed direction. The video playing progress bar displayed based on the above method has features such as draggable and clickable, so that the video played based on the above video playing progress bar supports multiple playing and other functions.

With the continuous development of Internet short video technology, people's demand for video types is becoming more and more diversified, and the videos with the different video types may have different display requirements for the playing progress bar. Therefore, how to enrich the display method for the video playing progress bar to meet the different display requirements of more and more video types for the playing progress bars is an urgent technical problem to be solved currently.

SUMMARY

In order to solve the above technical problem or at least partially solve the above technical problem, the present disclosure provides a display method for a video playing progress bar, as to enrich display methods for the video playing progress bar and meet the different display requirements of more and more video types for the playing progress bar.

In a first aspect, the present disclosure provides a display method for a video playing progress bar, and the method includes:

acquiring a played duration of a target video when monitoring that a current time reaches a preset time period;

determining a proportional relationship between the played duration of the target video and a total video duration;

determining position information of a progress standard bar on the video playing progress bar according to the proportional relationship;

determining an end position of a first color bar and a start position of a second color bar based on the position information of the progress standard bar on the video playing progress bar, the first color bar being used to represent the played duration of the target video, the second color bar being used to represent an unplayed duration of the target video, and a color of the first color bar being different from a color of the second color bar;

drawing the first color bar based on the end position of the first color bar, and drawing the second color bar based on the start position of the second color bar; and displaying the video playing progress bar of the target video based on the first color bar and the second color bar.

In an optional implementation, before displaying the video playing progress bar of the target video based on the first color bar and the second color bar, the method further includes:

drawing a preset animation based on the position information of the progress standard bar on the video playing progress bar;

displaying the video playing progress bar of the target video based on the first color bar and the second color bar includes:

displaying the video playing progress bar of the target video based on the preset animation, the first color bar, and the second color bar.

In an optional implementation, before drawing the preset animation based on the position information of the progress standard bar on the video playing progress bar, the method further includes:

determining an amplification factor of the preset animation according to the proportional relationship, the amplification factor being directly proportional to the proportional relationship;

drawing the preset animation based on the position information of the progress standard bar on the video playing progress bar includes:

amplifying an initial size original image corresponding to the preset animation based on the amplification factor to obtain an amplified animation; and drawing the amplified animation based on the position information of the progress standard bar on the video playing progress bar.

In an optional implementation, before drawing the preset animation based on the position information of the progress standard bar on the video playing progress bar, the method further includes:

determining whether the position information of the progress standard bar on the video playing progress bar is an endpoint position of the video playing progress bar;

drawing the preset animation based on the position information of the progress standard bar on the video playing progress bar includes:

in the case that it is determined that the position information is not the endpoint position of the video playing progress bar, drawing the preset animation based on the position information of the progress standard bar on the video playing progress bar.

In an optional implementation, the target video belongs to a video type that supports to be played only once by each user, and the video playing progress bar of the target video does not support a dragging function and a clicking function.

In an optional implementation, before drawing the first color bar based on the end position of the first color bar, and drawing the second color bar based on the start position of the second color bar, the method further includes:

determining the start position of the video playing progress bar as a start position of the first color bar, and determining the end position of the video playing progress bar as an end position of the second color bar;

drawing the first color bar based on the end position of the first color bar, and drawing the second color bar based on the start position of the second color bar includes:

drawing the first color bar based on the start position and the end position of the first color bar; and drawing the second color bar based on the start position and the end position of the second color bar.

In a second aspect, the present disclosure provides a display apparatus for a video playing progress bar, and the apparatus includes:

a first acquiring module, configured to acquire a played duration of a target video when monitoring that a current time reaches a preset time period;

a first determining module, configured to determine a proportional relationship between the played duration of the target video and a total video duration;

a second determining module, configured to determine position information of a progress standard bar on the video playing progress bar according to the proportional relationship;

a third determining module, configured to determine an end position of a first color bar and a start position of a second color bar based on the position information of the progress standard bar on the video playing progress bar, the first color bar being used to represent the played duration of the target video, the second color bar being used to represent an unplayed duration of the target video, and a color of the first color bar being different from a color of the second color bar;

a first drawing module, configured to draw the first color bar based on the end position of the first color bar, and draw the second color bar based on the start position of the second color bar; and a display module, configured to display the video playing progress bar of the target video based on the first color bar and the second color bar.

In a third aspect, the present disclosure provides a computer-readable storage medium, and an instruction is stored in the computer-readable storage medium. The instruction, when running on a terminal device, cause the terminal device to implement the above method.

In a fourth aspect, the present disclosure provides a device, which includes a memory, a processor, and a computer program stored on the memory and capable of running on the processor, and the processor implements the above method when executing the computer program.

In a fifth aspect, the present disclosure provides a computer program product, the computer program product includes a computer program/instruction, and the above method is implemented when the computer program/instruction is executed by a processor.

Technical schemes provided in embodiments of the present disclosure have at least the following advantages compared to existing technologies.

An embodiment of the present disclosure provides a display method for a video playing progress bar. Firstly, when it is monitored that a current time reaches a preset time period, a played duration of a target video is acquired, and a proportional relationship between the played duration of the target video and a total video duration is determined. Then, according to the proportional relationship, position information of a progress standard bar on the video playing progress bar is determined, and based on the position information, an end position of a first color bar and a start position of a second color bar are determined. Furthermore, the first color bar is drawn based on the end position of the first color bar, and the second color bar is drawn based on the start position of the second color bar, and based on the first color bar and the second color bar, the video playing progress bar of the target video is displayed. The display method for the video playing progress bar provided in the embodiment of the present disclosure is different from an existing method of using a long rectangular control of a system as a carrier to display the playing progress of the video, display method for the video playing progress bar is enriched, and the different display requirements of more and more video types for the playing progress bar are met.

BRIEF DESCRIPTION OF THE DRAWINGS

The drawings herein are incorporated into and form a part of the specification, illustrate embodiments consistent with the present disclosure, and are used in conjunction with the specification to explain the principles of the present disclosure.

To more clearly illustrate the embodiments of the present disclosure, the drawings required to be used for the embodiments are briefly described in the following, obviously, for those skilled in the art, other drawings can be acquired based on these drawings without any inventive work.

FIG. 1 is a flowchart of a display method for a video playing progress bar provided in an embodiment of the present disclosure;

FIG. 2 is a schematic diagram of a video playing progress bar provided in an embodiment of the present disclosure;

FIG. 4 is a flowchart of another display method for a video playing progress bar provided in an embodiment of the present disclosure;

DETAILED DESCRIPTION

Figure 3:
FIG. 3 is a schematic diagram of a video playing page provided in an embodiment of the present disclosure.

In order to understand the above objects, features and advantages of the present disclosure more clearly, the solutions of the present disclosure are further described below. It should be noted that embodiments and features in the embodiments of the present disclosure may be combined with each other without conflict.

Many specific details are set forth in the following description to facilitate a full understanding of the present disclosure, but the present disclosure may also be implemented in other ways different from those described herein; obviously, the embodiments in the specification are only a part but not all of the embodiments of the present disclosure.

With the continuous development of Internet short video technology, people's demand for video types is becoming more and more diversified, and with it, the different video types may have different display requirements for the video playing progress bar.

For example, a flash by video type refers to a video type that supports to be played only once by each user (except for a video author). Based on a feature that a flash by video only supports to be played only once, it is apparent that an existing draggable and clickable display method for the video playing progress bar may not meet the requirements for the flash by video.

Therefore, how to enrich the display method for the video playing progress bar to meet the different display requirements of more and more video types for the playing progress bar is an urgent technical problem to be solved currently.

For this purpose, an embodiment of the present disclosure provides a display method for a video playing progress bar. Firstly, when it is monitored that a current time reaches a preset time period, a played duration of a target video is acquired, and a proportional relationship between the played duration of the target video and a total video duration is determined. Then, according to the proportional relationship, position information of a progress standard bar on the video playing progress bar is determined, and based on the position information, an end position of a first color bar and a start position of a second color bar are determined. Furthermore, the first color bar is drawn based on the end position of the first color bar, and the second color bar is drawn based on the start position of the second color bar, and based on the first color bar and the second color bar, the video playing progress bar of the target video is displayed. The display method for the video playing progress bar provided in the embodiment of the present disclosure is different from an existing method of using a long rectangular control of a system as a carrier to display the playing progress of the video, display method for the video playing progress bar is enriched, and the different display requirements of more and more video types for the playing progress bar are met.

Based on this, an embodiment of the present disclosure provides a display method for a video playing progress bar. Referring to FIG. 1, which is a flowchart of a display method for a video playing progress bar provided in an embodiment of the present disclosure, and the method includes:

S101: acquiring a played duration of a target video when monitoring that a current time reaches a preset time period.

In the embodiment of the present disclosure, the time period for drawing the video playing progress bar is preset, for example, the preset time period may be set to 0.2 seconds. In other words, the played duration of the target video is acquired every 0.2 seconds.

In practical applications, a timer may be used to time, and the played duration of the target video is acquired once by the timer every the preset time period (e.g., every 0.2 seconds). In addition, the total video duration of the target video may also be acquired in advance.

The embodiment of the present disclosure does not limit the acquisition mode of the played duration and the total video duration of the target video.

S102: determining a proportional relationship between the played duration of the target video and a total video duration.

In the embodiment of the present disclosure, after the played duration and the total video duration of the target video are acquired, the proportional relationship between the played duration and the total video duration is calculated. The proportion relationship between the played duration and the total video duration may represent an existing playing progress of the target video.

In an optional implementation, after the proportional relationship between the played duration and the total video duration is determined, it is firstly judged whether the proportional relationship is 0 or 1. If the proportional relationship is determined to be 0, it is indicated that the target video is located in an unplayed state; and if the proportional relationship is determined to be 1, it is indicated that the target video is located in a playing end state.

S103: determining position information of a progress standard bar on the video playing progress bar according to the proportional relationship.

In the embodiment of the present disclosure, after the proportional relationship between the played duration and the total video duration is determined, according to the proportional relationship, the position information of the progress standard bar on the video playing progress bar is determined. Specifically, the position information of the progress standard bar on the video playing progress bar is used to represent the proportional relationship between the played duration of the target video and the total video duration.

The position information of the progress standard bar on the video playing progress bar may include a distance between the progress standard bar and the start position or end position of the video playing progress bar, the progress standard bar may be a preset transparent vertical bar, and the progress standard bar may serve as a drawing reference bar of the video playing progress bar.

In practical applications, assuming that the proportional relationship between the played duration of the target video and the total video duration is 0, it is indicated that the target video is in the unplayed state. At this moment, it may be determined that the progress standard bar is located in a leftmost position on the video playing progress bar. Assuming that the proportional relationship between the played duration of the target video and the total video duration is 1, it is indicated that the target video is located in the playing end state. At this moment, it may be determined that the progress standard bar is located in a rightmost position on the video playing progress bar. Assuming that the proportional relationship between the played duration of the target video and the total video duration is ½, it is indicated that the target video is in a playing state. At this moment, it may be determined that the progress standard bar is located in a middle position on the video playing progress bar. In the case that the proportional relationship between the played duration of the target video and the total video duration is other values, it may be understood by referring to the above, and it is not repeatedly described here.

S104: determining an end position of a first color bar and a start position of a second color bar based on the position information of the progress standard bar on the video playing progress bar.

The first color bar is used to represent the played duration of the target video, the second color bar is used to represent an unplayed duration of the target video, and the color of the first color bar is different from that of the second color bar.

In the embodiment of the present disclosure, after the position information of the progress standard bar on the video playing progress bar is determined, the position information is determined as the end position of the first color bar, and the position information is determined as the start position of the second color bar.

Because the first color bar is used to represent the played duration of the target video, the start position of the first color bar corresponds to a start time point of the target video, namely the leftmost position on the video playing progress bar. For this purpose, the embodiment of the present disclosure determines the leftmost position on the video playing progress bar as the start position of the first color bar, and determines the position information of the progress standard bar on the video playing progress bar as the end position of the first color bar.

Similarly, because the second color bar is used to represent the unplayed duration of the target video, the end position of the second color bar corresponds to an end time point of the target video, namely the rightmost position on the video playing progress bar. For this purpose, the embodiment of the present disclosure determines the rightmost position on the video playing progress bar as the end position of the second color bar, and determines the position information of the progress standard bar on the video playing progress bar as the start position of the second color bar.

In practical applications, the start position of the video playing progress bar is determined as the start position of the first color bar, and the end position of the video playing progress bar is determined as the end position of the second color bar, so that the first color bar may be drawn based on the start position and the end position of the first color bar, and the second color bar may be drawn based on the start position and the end position of the second color bar.

In addition, in order to display the playing progress of the target video based on the video playing progress bar, two different colors with apparent contrasts may be used as the colors of the first color bar and the second color bar respectively. For example, the first color bar may be a gradient gray bar, and the second color bar may be a white bar.

S105: drawing the first color bar based on the end position of the first color bar, and drawing the second color bar based on the start position of the second color bar.

In the embodiment of the present disclosure, after the start position, the end position, and the color of the first color bar are determined, the first color bar is drawn; and after the start position, the end position, and the color of the second color bar are determined, the second color bar is drawn.

In an optional implementation, the first color bar and the second color bar are drawn in a video playing progress bar display area below a playing page of the target video.

S106: displaying the video playing progress bar of the target video based on the first color bar and the second color bar.

In the embodiment of the present disclosure, after the drawing of the first color bar and the second color bar is completed, the video playing progress bar of the target video composed of the first color bar and the second color bar is displayed. As shown in FIG. 2, it is a schematic diagram of a video playing progress bar provided in an embodiment of the present disclosure. The first color bar is the gray bar, and the second color bar is the white bar. Based on the video playing progress bar composed of the first color bar and the second color bar, the playing progress of the target video is displayed. As shown in FIG. 3, it is a schematic diagram of a video playing page provided in an embodiment of the present disclosure, the video playing progress bar is displayed below the video playing page.

In the display method for the video playing progress bar provided in the embodiment of the present disclosure. Firstly, when it is monitored that a current time reaches a preset time period, a played duration of a target video is acquired, and a proportional relationship between the played duration of the target video and a total video duration is determined. Then, according to the proportional relationship, position information of a progress standard bar on the video playing progress bar is determined, and based on the position information, an end position of a first color bar and a start position of a second color bar are determined. Furthermore, the first color bar is drawn based on the end position of the first color bar, and the second color bar is drawn based on the start position of the second color bar, and based on the first color bar and the second color bar, the video playing progress bar of the target video is displayed. The display method for the video playing progress bar provided in the embodiment of the present disclosure is different from an existing method of using a long rectangular control of a system as a carrier to display the playing progress of the video, display method for the video playing progress bar is enriched, and the different display requirements of more and more video types for the playing progress bar are met.

In the embodiment of the present disclosure, the target video may belong to a video type that supports to be played only once by each user, namely the aforementioned flash by video type. Therefore, the video playing progress bar of the target video in the embodiment of the present disclosure does not support a dragging function and a clicking function, so that the target video only supports to be played only once by each user.

In order to further enhance the display effect of the video playing progress bar, the embodiment of the present disclosure may draw a preset animation on the video playing progress bar, as to increase the expressive power of the video playing progress bar in the playing process of the target video.

For this purpose, an embodiment of the present disclosure further provides a display method for a video playing progress bar. Referring to FIG. 4, it is a flowchart of another display method for a video playing progress bar provided in an embodiment of the present disclosure, the method includes:

S401: acquiring a played duration of a target video when monitoring that a current time reaches a preset time period.

S402: determining a proportional relationship between the played duration of the target video and a total video duration.

S403: determining position information of a progress standard bar on the video playing progress bar according to the proportional relationship.

S404: determining an end position of a first color bar and a start position of a second color bar based on the position information of the progress standard bar on the video playing progress bar.

The first color bar is used to represent the played duration of the target video, the second color bar is used to represent an unplayed duration of the target video, and the color of the first color bar is different from that of the second color bar.

S405: drawing the first color bar based on the end position of the first color bar, and drawing the second color bar based on the start position of the second color bar.

S401-S405 in the embodiment of the present disclosure may be understood by referring to the description of S101-S105 in the above embodiments, and it is not repeatedly described here.

S406: drawing a preset animation based on the position information of the progress standard bar on the video playing progress bar.

In the embodiment of the present disclosure, after the position information of the progress standard bar on the video playing progress bar is determined, the position information is determined as a drawing position of the preset animation, and the preset animation is drawn in the drawing position.

As shown in FIG. 2 above, the preset animation may be a flame burning animation. After the position information of the progress standard bar on the video playing progress bar is determined, the flame burning animation is drawn at the position information, as to achieve the effect of burning flames on the video playing progress bar in the playing process of the target video, and reflect the features of the flash by video type of "burn after reading" and only supporting to be played only once by each user.

In order to further improve the display effect of the video playing progress bar, the embodiment of the present disclosure may also amplify the preset animation drawn as the played duration of the target video is increased.

In practical applications, before the preset animation is drawn, the proportional relationship between the played duration of the target video and the total video duration is firstly determined, and an amplification factor of the preset animation is determined according to the proportional relationship, the amplification factor is directly proportional to the proportional relationship. In other words, the proportional relationship is larger, and the amplification factor of the preset animation is larger.

In an optional implementation, the amplification factor is directly proportional to the proportional relationship, which may be reflected based on the following mode. Specifically, amplification factor=1+0.5*proportional relationship.

After the amplification factor of the preset animation is determined, based on the amplification factor determined, an initial size original image of the preset animation is amplified, to obtain an amplified animation. Then, based on the position information of the progress standard bar on the video playing progress bar, the amplified animation is drawn.

S407: displaying the video playing progress bar of the target video based on the preset animation, the first color bar, and the second color bar.

In the embodiment of the present disclosure, after the drawing of the preset animation, the first color bar, and the second color bar is completed, the video playing progress bar of the target video composed of the first color bar, the second color bar, and the preset animation is displayed.

In addition, because the preset animation on the video playing progress bar is usually not displayed when the video is played completely, the embodiment of the present disclosure may also determine whether the position information of the progress standard bar on the video playing progress bar is an endpoint position of the video playing progress bar, namely a last side position. If it is determined that the position information is not the endpoint position of the video playing progress bar, the preset animation is drawn based on the position information of the progress standard bar on the video playing progress bar; otherwise, it is indicated that the target video is located in the playing end state, and the preset animation may not be drawn on the video playing progress bar at this moment.

The display method for the video playing progress bar provided in the embodiment of the present disclosure is different from an existing method of using a long rectangular control of a system as a carrier to display the playing progress of the video, the display method for the video playing progress bar is enriched, and the different display requirements of more and more video types for the playing progress bar are met.

In addition, the embodiment of the present disclosure may also display animation effects such as a flame burning style on the video playing progress bar, thus the display effect of the video playing progress bar is further improved, and the user experience is improved.

Figure 5:
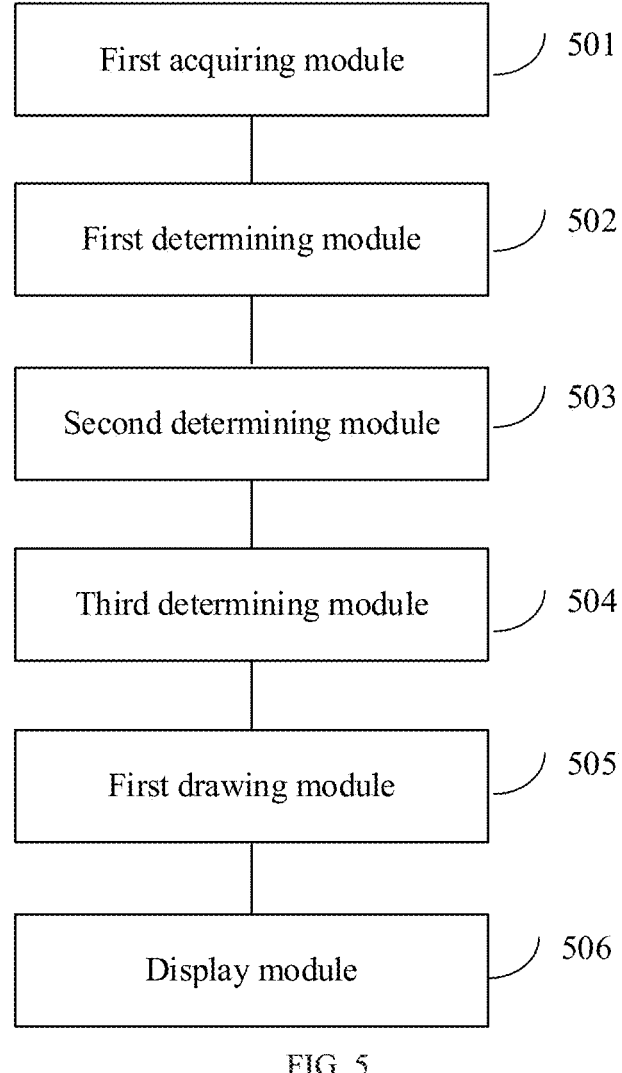
FIG. 5 is a structural schematic diagram of a display apparatus for a video playing progress bar provided in an embodiment of the present disclosure.

Based on the same inventive concept as the above method embodiments, the present disclosure further provides a display apparatus for a video playing progress bar. Referring to FIG. 5, it is a structural schematic diagram of a display apparatus for a video playing progress bar provided in an embodiment of the present disclosure, and the apparatus includes:

a first acquiring module 501, configured to acquire a played duration of a target video when monitoring that a current time reaches a preset time period;

a first determining module 502, configured to determine a proportional relationship between the played duration of the target video and a total video duration;

a second determining module 503, configured to determine position information of a progress standard bar on the video playing progress bar according to the proportional relationship;

a third determining module 504, configured to determine an end position of a first color bar and a start position of a second color bar based on the position information of the progress standard bar on the video playing progress bar, the first color bar being used to represent the played duration of the target video, the second color bar being used to represent an unplayed duration of the target video, and the color of the first color bar being different from that of the second color bar;

a first drawing module 505, configured to draw the first color bar based on the end position of the first color bar, and draw the second color bar based on the start position of the second color bar; and a display module 506, configured to display the video playing progress bar of the target video based on the first color bar and the second color bar.

In an optional implementation, the apparatus further includes:

a second drawing module, configured to draw a preset animation based on the position information of the progress standard bar on the video playing progress bar;

the display module is specifically configured to:

display the video playing progress bar of the target video based on the preset animation, the first color bar, and the second color bar.

In an optional implementation, the apparatus further includes:

a fourth determining module, configured to determine an amplification factor of the preset animation according to the proportional relationship, the amplification factor being directly proportional to the proportional relationship;

the second drawing module includes:

an amplification sub-module, configured to amplify an initial size original image corresponding to the preset animation based on the amplification factor to obtain an amplified animation; and a first drawing sub-module, configured to draw the amplified animation based on the position information of the progress standard bar on the video playing progress bar.

In an optional implementation, the apparatus further includes:

a fifth determining module, configured to determine whether the position information of the progress standard bar on the video playing progress bar is an endpoint position of the video playing progress bar;

correspondingly, the second drawing module includes:

a second drawing sub-module, configured to draw the preset animation based on the position information of the progress standard bar on the video playing progress bar, in the case that it is determined that the position information is not the endpoint position of the video playing progress bar.

In an optional implementation, the target video belongs to a video type that supports to be played only once by each user, and the video playing progress bar of the target video does not support a dragging function and a clicking function.

In an optional implementation, the apparatus further includes:

a sixth determining module, configured to determine the start position of the video playing progress bar as a start position of the first color bar, and determine the endpoint position of the video playing progress bar as an end position of the second color bar;

the first drawing module includes:

a third drawing sub-module, configured to draw the first color bar based on the start position and the end position of the first color bar; and a fourth drawing sub-module, configured to draw the second color bar based on the start position and the end position of the second color bar.

In addition to the above method and apparatus, an embodiment of the present disclosure further provides a computer readable storage medium, and an instruction is stored in the computer readable storage medium. The instruction, when running on a terminal device, cause the terminal device to implement the display method for the video playing progress bar in the embodiment of the present disclosure.

An embodiment of the present disclosure further provides a computer program product, the computer program product includes a computer program/instruction, and the display method for the video playing progress bar in the embodiment of the present disclosure is implemented when the computer program/instruction is executed by a processor.

Figure 6:
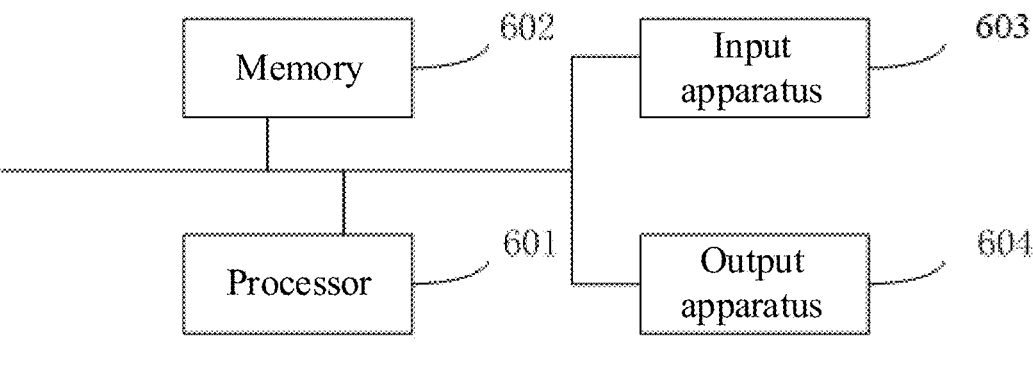
FIG. 6 is a structural schematic diagram of a display device for a video playing progress bar provided in an embodiment of the present disclosure.

In addition, an embodiment of the present disclosure further provides a display device for a video playing progress bar, as shown in FIG. 6, it may include:

a processor 601, a memory 602, an input apparatus 603, and an output apparatus 604. The number of the processors 601 in the display device for the video playing progress bar may be one or more, and one processor is taken as an example in FIG. 6. In some embodiments of the present disclosure, the processor 601, the memory 602, the input apparatus 603, and the output apparatus 604 may be connected by a bus or other means, herein the connection by the bus is taken as an example in FIG. 6.

The memory 602 may be used to store software programs and modules, and the processor 601 may execute various functional applications and data processing of the display device for the video playing progress bar by running the software programs and modules stored in the memory 602. The memory 602 may mainly include a storage program area and a storage data area, herein the storage program area may store an operating system, an application program required for at least one function and the like. In addition, the memory 602 may include a high-speed random access memory, as well as a non-volatile memory, such as at least one disk storage device, a flash memory device, or other volatile solid-state storage devices. The input apparatus 603 may be used to receive input digital or character information, and generate a signal input related to user setting and functional control of the display device for the video playing progress bar.

Specifically, in this embodiment, the processor 601 may load an executable file corresponding to the process of one or more application programs into the memory 602 according to the following instructions, and the processor 601 may run the application programs stored in the memory 602, as to achieve various functions of the above display device for the video playing progress bar.

It should be noted that, in the present disclosure, the relational terms such as "first", "second", and the like, are only used to distinguish one entity or operation from another entity or operation, and are not intended to require or imply the existence of any actual relationship or order between these entities or operations. Furthermore, the terms "comprise/comprising", "include/including", or any other variations thereof are intended to cover a non-exclusive inclusion such that a process, method, article, or device that includes a list of elements includes not only those elements, but also other elements not expressly listed, or elements inherent to the process, method, article, or device. Without further limitation, an element qualified by the statement "comprises/includes a . . . " does not exclude the presence of additional identical elements in the process, method, article, or device that includes the element.

What have been described above are only specific implementations of the present disclosure, enabling those skilled in the art to understand or implement the present disclosure. Various modifications to these embodiments are apparent to those skilled in the art, and the generic principles defined herein may be implemented in other embodiments without departing from the spirit or scope of the present disclosure. Therefore, the present disclosure is not to be limited to the embodiments herein but is intended to be accorded the widest scope consistent with the principles and novel features disclosed herein.

The invention claimed is:

1. A display method for a video playing progress bar, comprising:

acquiring a played duration of a target video at a preset time interval, wherein the played duration of the target video is acquired every preset time interval;

acquiring a total video duration of the target video in advance;

determining a proportional relationship between the played duration of the target video and a total video duration after the played duration of the target video and the total video duration are acquired, wherein the proportion relationship between the played duration of the target video and the total video duration represents an existing playing progress of the target video;

determining position information of a progress standard bar on the video playing progress bar according to the proportional relationship;

determining an end position of a first color bar and a start position of a second color bar based on the position information of the progress standard bar on the video playing progress bar, wherein, the first color bar is used to represent the played duration of the target video, the second color bar is used to represent an unplayed duration of the target video, and a color of the first color bar is different from a color of the second color bar;

drawing the first color bar based on the end position of the first color bar, and drawing the second color bar based on the start position of the second color bar; and displaying the video playing progress bar of the target video based on the first color bar and the second color bar.

2. The method according to claim 1, wherein, before displaying the video playing progress bar of the target video based on the first color bar and the second color bar, the method further comprises:

drawing a preset animation based on the position information of the progress standard bar on the video playing progress bar;

displaying the video playing progress bar of the target video based on the first color bar and the second color bar comprises:

displaying the video playing progress bar of the target video based on the preset animation, the first color bar, and the second color bar.

3. The method according to claim 2, wherein, before drawing the preset animation based on the position information of the progress standard bar on the video playing progress bar, the method further comprises:

determining an amplification factor of the preset animation according to the proportional relationship, wherein the amplification factor is directly proportional to the proportional relationship;

drawing the preset animation based on the position information of the progress standard bar on the video playing progress bar comprises:

amplifying an initial size original image corresponding to the preset animation based on the amplification factor to obtain an amplified animation; and drawing the amplified animation based on the position information of the progress standard bar on the video playing progress bar.

4. The method according to claim 2, wherein, before drawing the preset animation based on the position information of the progress standard bar on the video playing progress bar, the method further comprises:

determining whether the position information of the progress standard bar on the video playing progress bar is an endpoint position of the video playing progress bar;

drawing the preset animation based on the position information of the progress standard bar on the video playing progress bar comprises:

in a case that it is determined that the position information is not the endpoint position of the video playing progress bar, drawing the preset animation based on the position information of the progress standard bar on the video playing progress bar.

5. The method according to claim 1, wherein the target video belongs to a video type that supports to be played only once by each user, and the video playing progress bar of the target video does not support a dragging function and a clicking function.

6. The method according to claim 1, wherein, before drawing the first color bar based on the end position of the first color bar, and drawing the second color bar based on the start position of the second color bar, the method further comprises:

determining a start position of the video playing progress bar as a start position of the first color bar, and determining an end position of the video playing progress bar as an end position of the second color bar;

drawing the first color bar based on the end position of the first color bar, and drawing the second color bar based on the start position of the second color bar comprises:

drawing the first color bar based on the start position and the end position of the first color bar; and drawing the second color bar based on the start position and the end position of the second color bar.

7. A non-transitory computer-readable storage medium, wherein an instruction is stored in the computer-readable storage medium, and the instruction upon running on a terminal device, causes the terminal device to implement a display method for a video playing progress bar, and the method comprises:

acquiring a played duration of a target video at a preset time interval, wherein the played duration of the target video is acquired every preset time interval;

acquiring a total video duration of the target video in advance;

determining a proportional relationship between the played duration of the target video and a total video duration after the played duration of the target video and the total video duration are acquired, wherein the proportion relationship between the played duration of the target video and the total video duration represents an existing playing progress of the target video;

determining position information of a progress standard bar on the video playing progress bar according to the proportional relationship;

determining an end position of a first color bar and a start position of a second color bar based on the position information of the progress standard bar on the video playing progress bar, wherein, the first color bar is used to represent the played duration of the target video, the second color bar is used to represent an unplayed duration of the target video, and a color of the first color bar is different from a color of the second color bar;

drawing the first color bar based on the end position of the first color bar, and drawing the second color bar based on the start position of the second color bar; and displaying the video playing progress bar of the target video based on the first color bar and the second color bar.

8. A device, comprising: a memory, a processor, and a computer program stored on the memory and capable of running on the processor, wherein the processor, upon executing the computer program, implements a display method for a video playing progress bar, which comprises:

acquiring a played duration of a target video at a preset time interval, wherein the played duration of the target video is acquired every preset time interval;

acquiring a total video duration of the target video in advance;

determining a proportional relationship between the played duration of the target video and a total video duration after the played duration of the target video and the total video duration are acquired, wherein the proportion relationship between the played duration of the target video and the total video duration represents an existing playing progress of the target video;

determining position information of a progress standard bar on the video playing progress bar according to the proportional relationship;

determining an end position of a first color bar and a start position of a second color bar based on the position information of the progress standard bar on the video playing progress bar, wherein, the first color bar is used to represent the played duration of the target video, the second color bar is used to represent an unplayed duration of the target video, and a color of the first color bar is different from a color of the second color bar;

drawing the first color bar based on the end position of the first color bar, and drawing the second color bar based on the start position of the second color bar; and displaying the video playing progress bar of the target video based on the first color bar and the second color bar.

9. A computer program product, comprising a computer program/instruction, wherein the computer program/instruction, upon being executed by a processor, implements the method according to claim 1.

10. The method according to claim 3, wherein, before drawing the preset animation based on the position information of the progress standard bar on the video playing progress bar, the method further comprises:

determining whether the position information of the progress standard bar on the video playing progress bar is an endpoint position of the video playing progress bar;

drawing the preset animation based on the position information of the progress standard bar on the video playing progress bar comprises:

in a case that it is determined that the position information is not the endpoint position of the video playing progress bar, drawing the preset animation based on the position information of the progress standard bar on the video playing progress bar.

11. The medium according to claim 7, wherein, before displaying the video playing progress bar of the target video based on the first color bar and the second color bar, the method further comprises:

drawing a preset animation based on the position information of the progress standard bar on the video playing progress bar;

the displaying the video playing progress bar of the target video based on the first color bar and the second color bar comprises:

displaying the video playing progress bar of the target video based on the preset animation, the first color bar, and the second color bar.

12. The medium according to claim 11, wherein, before drawing the preset animation based on the position information of the progress standard bar on the video playing progress bar, the method further comprises:

determining an amplification factor of the preset animation according to the proportional relationship, wherein the amplification factor is directly proportional to the proportional relationship;

the drawing the preset animation based on the position information of the progress standard bar on the video playing progress bar comprises:

amplifying an initial size original image corresponding to the preset animation based on the amplification factor to obtain an amplified animation; and drawing the amplified animation based on the position information of the progress standard bar on the video playing progress bar.

13. The medium according to claim 11, wherein, before drawing the preset animation based on the position information of the progress standard bar on the video playing progress bar, the method further comprises:

determining whether the position information of the progress standard bar on the video playing progress bar is an endpoint position of the video playing progress bar;

drawing the preset animation based on the position information of the progress standard bar on the video playing progress bar comprises:

in a case that it is determined that the position information is not the endpoint position of the video playing progress bar, drawing the preset animation based on the position information of the progress standard bar on the video playing progress bar.

14. The device according to claim 8, wherein, before displaying the video playing progress bar of the target video based on the first color bar and the second color bar, the method further comprises:

drawing a preset animation based on the position information of the progress standard bar on the video playing progress bar;

the displaying the video playing progress bar of the target video based on the first color bar and the second color bar comprises:

displaying the video playing progress bar of the target video based on the preset animation, the first color bar, and the second color bar.

15. The device according to claim 14, wherein, before drawing the preset animation based on the position information of the progress standard bar on the video playing progress bar, the method further comprises:

determining an amplification factor of the preset animation according to the proportional relationship, wherein the amplification factor is directly proportional to the proportional relationship;

the drawing the preset animation based on the position information of the progress standard bar on the video playing progress bar comprises:

amplifying an initial size original image corresponding to the preset animation based on the amplification factor to obtain an amplified animation; and drawing the amplified animation based on the position information of the progress standard bar on the video playing progress bar.

16. The device according to claim 14, wherein, before drawing the preset animation based on the position information of the progress standard bar on the video playing progress bar, the method further comprises:

determining whether the position information of the progress standard bar on the video playing progress bar is an endpoint position of the video playing progress bar;

drawing the preset animation based on the position information of the progress standard bar on the video playing progress bar comprises:

in a case that it is determined that the position information is not the endpoint position of the video playing progress bar, drawing the preset animation based on the position information of the progress standard bar on the video playing progress bar.

17. The device according to claim 8, wherein the target video belongs to a video type that supports to be played only once by each user, and the video playing progress bar of the target video does not support a dragging function and a clicking function.

18. The device according to claim 8, wherein, before drawing the first color bar based on the end position of the first color bar, and drawing the second color bar based on the start position of the second color bar, the method further comprises:

determining a start position of the video playing progress bar as a start position of the first color bar, and determining an end position of the video playing progress bar as an end position of the second color bar;

drawing the first color bar based on the end position of the first color bar, and drawing the second color bar based on the start position of the second color bar comprises:

drawing the first color bar based on the start position and the end position of the first color bar; and drawing the second color bar based on the start position and the end position of the second color bar.

\* \* \* \* \*